United States Patent [19]

Nau

[11] 3,938,469

[45] Feb. 17, 1976

[54] APPARATUS FOR COATING PARTICULATE MATERIAL WITH FINELY DIVIDED SOLIDS

[75] Inventor: Harold Henry Nau, Pennington, N.J.

[73] Assignee: American Cyanamid Company, Stamford, Conn.

[22] Filed: Sept. 14, 1973

[21] Appl. No.: 397,551

Related U.S. Application Data

[60] Continuation-in-part of Ser. No. 230,016, Feb. 28, 1972, abandoned, which is a division of Ser. No. 149,350, June 2, 1971, Pat. No. 3,666,523, and a continuation-in-part of Ser. No. 804,621, March 5, 1969, abandoned.

[52] U.S. Cl. ................ 118/303; 118/309; 118/316
[51] Int. Cl.² ......................................... B05C 5/00
[58] Field of Search ............ 118/303, 308, 309, 50, 118/315, 316; 117/100 A, 100 B; 427/202, 212, 214

[56] References Cited

UNITED STATES PATENTS

| | | | |
|---|---|---|---|
| 2,097,914 | 11/1937 | Cooper et al. | 118/303 |
| 2,197,792 | 4/1940 | Ereckson | 118/303 X |
| 2,631,355 | 3/1953 | Craig | 118/303 X |
| 3,198,655 | 8/1965 | Gisiger | 118/303 X |

*Primary Examiner*—John P. McIntosh
*Attorney, Agent, or Firm*—H. G. Jackson

[57] ABSTRACT

A method and apparatus is given for uniformly coating particulate fertilizer material with small amounts of finely divided micro and/or secondary nutrients by forming the particulate base fertilizer material in a falling curtain, spraying the base material with a binder solution, finally mixing in an agitated bed the base material with the finely divided nutrients, thus giving a product of micro and/or secondary nutrients uniformly distributed over the surfaces of the particulate base fertilizer.

1 Claim, 3 Drawing Figures

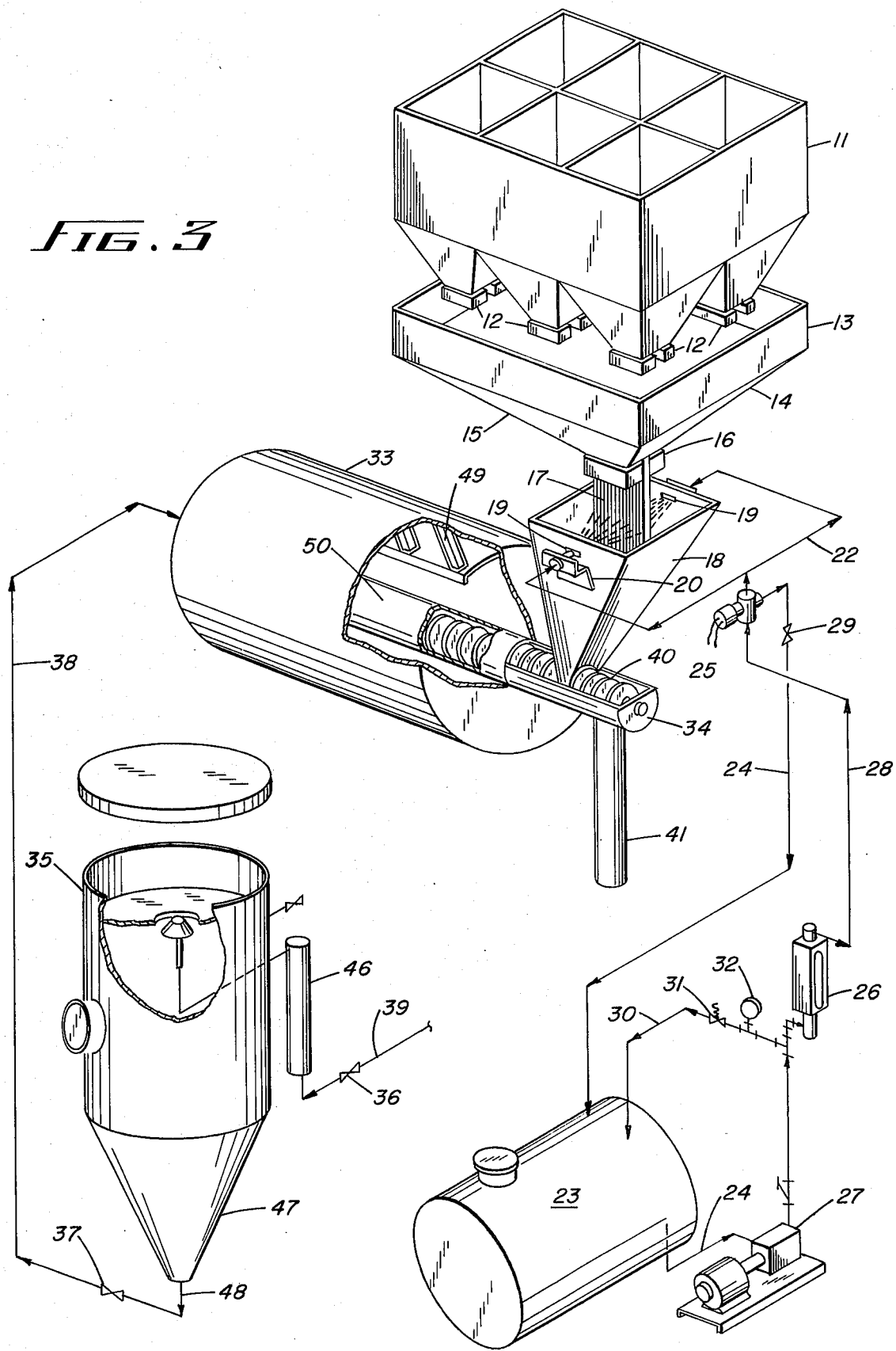

APPARATUS FOR COATING PARTICULATE MATERIAL WITH FINELY DIVIDED SOLIDS

This is a continuation-in-part of co-pending Ser. No. 230,016, filed Feb. 28, 1972, now abandoned, which is a division of Ser. No. 149,350, filed June 2, 1971, now U.S. Pat. No. 3,666,523 (1972). Ser. No. 149,350 is a continuation-in-part of Ser. No. 804,621, filed Mar. 5, 1969, now abandoned.

The present invention relates to an improved apparatus for preparing a granular mixed fertilizer. More particularly, it relates to a novel procedure for preparing a mixed granular fertilizer containing uniformly distributed finely divided secondary nutrients or micronutrients or both on granular primary fertilizer materials.

In many farming areas of the world, including those of the United States, croplands have gradually become deficient in elements essential for adequate growth. Nitrogen, phosphorous, and potassium can be readily supplied to rejuvenate the soil by commercially available primary fertilizers. However, micronutrients and secondary nutrients consisting of such elements as copper, manganese, zinc, boron, iron, molybdenum, calcium, magnesium and sulfur among others have been found to be lacking in many soils. Such element deficiencies result in reduced crop yields, since optimum growth requires the presence in the soil of nearly all the above elements.

To provide all the essential elements to soil, it has been recommended that relatively small amounts of micronutrients or secondary nutrients or both be incorporated with primary fertilizers.

The art of applying coating of finely divided solids to particles, pellets, prills, granules, flakes and the like has been well developed in a wide variety of industrial areas ranging from breakfast cereals, drugs, animal feed supplements, ore reduction processes and fertilizers. Each area has encountered problems peculiar unto itself but all have been confronted with the basic problem of obtaining uniformity of coating, effective binding of finely divided solids to the substrate to which it has been applied, and elimination of caking of the materials in the blending or mixing equipment. Although major advances have been made in both processes and apparatus which produce relatively small quantities of coated materials, heretofore no entirely satisfactory method or apparatus has been available for uniformly coating large amounts of heavy granular materials with very small amounts of extremely finely divided solids, as for example, those employed in the production of finished fertilizers designed to provide the essential elements to the soil.

The need for such a system has become exceedingly apparent with the advent of high yield fertilization programs and the recognition that deficiencies in soil of specific elements, commonly referred to as micronutrients and secondary nutrients causes a marked depression in the yields of certain crops.

As crops and soils are widely varied and the need for a specific element or elements differs accordingly, it would be most desirable if a process could be developed which provided for the preparation of finished fertilizers on a prescription-type basis. To this end, liquid fertilizers have been suggested. However, limited solubility of micronutrients and secondary nutrients in fertilizer solutions and limited availability of application equipment are a deterrent to universal acceptability. Processes for chemically granulating fertilizers containing desired amounts of specific elements are available, but, in practice these processes do not lend themselves to preparation of fertilizers on individual prescription. Finally, where prescription manufacture has been attempted utilizing conventional equipment and simply adding the micro and/or secondary nutrients to the agitated bed of fertilizer and spraying or sparging the binder solution into the bed, caking of materials on the mixer and nonuniform distribution of the micro and secondary nutrients in the product has occurred.

It is, therefore, an object of the present invention to provide a novel apparatus for uniformly coating particulate material with small amounts of finely divided material. It is also an object of the invention to provide an apparatus for preparing finished granular fertilizers uniformly coated with exiguous amounts of extremely finely divided micronutrients and secondary nutrients, on an individual prescription basis.

To properly show and describe the invention, the following drawings are given:

FIG. 3 is an exploded view of the pressurized system employed for the introduction of the finely divided coating material to the mixer.

Figure 1:
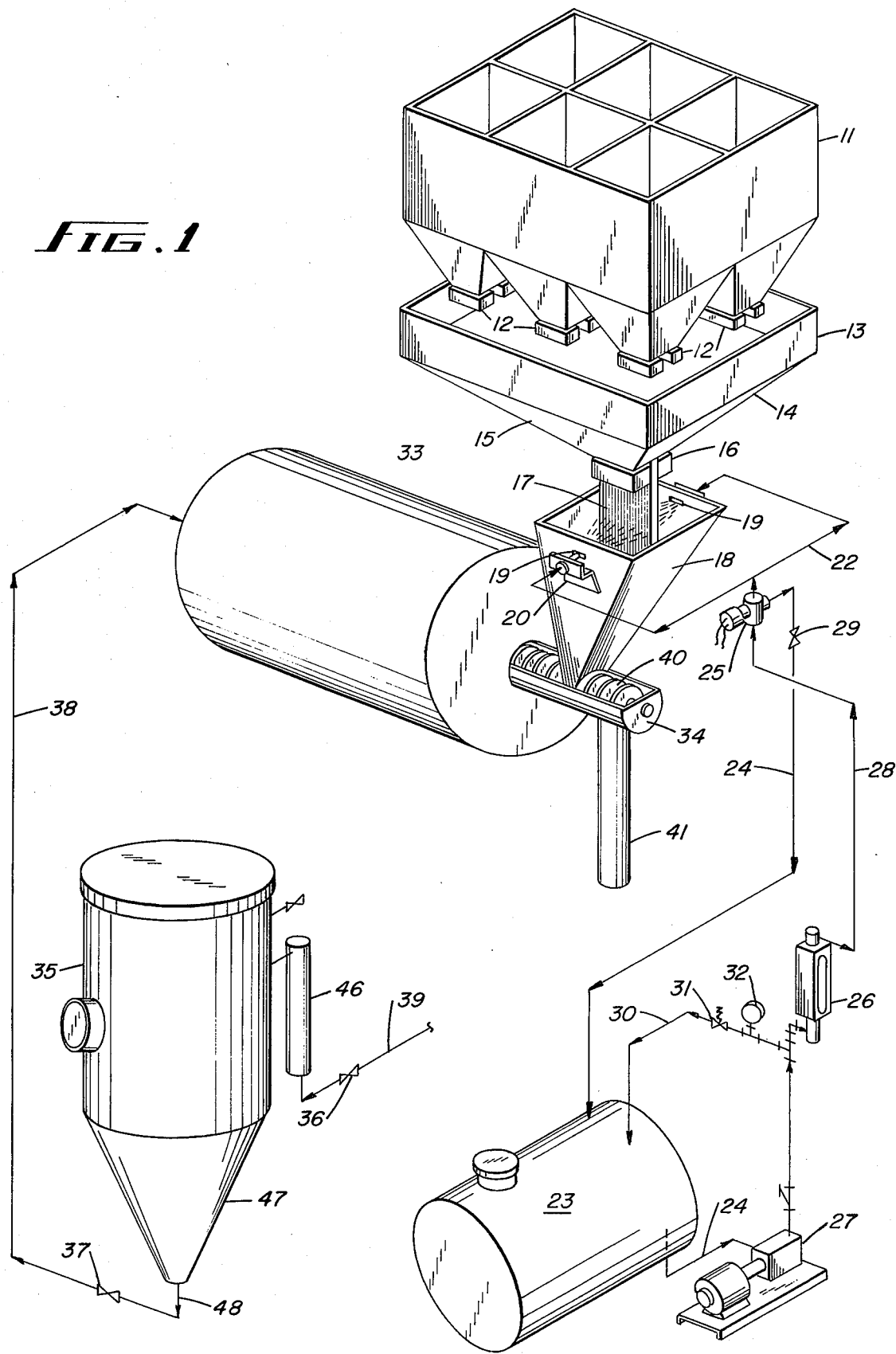
FIG. 1 is a side elevational view showing a preferred embodiment of the invention arranged schematically.
Figure 2:
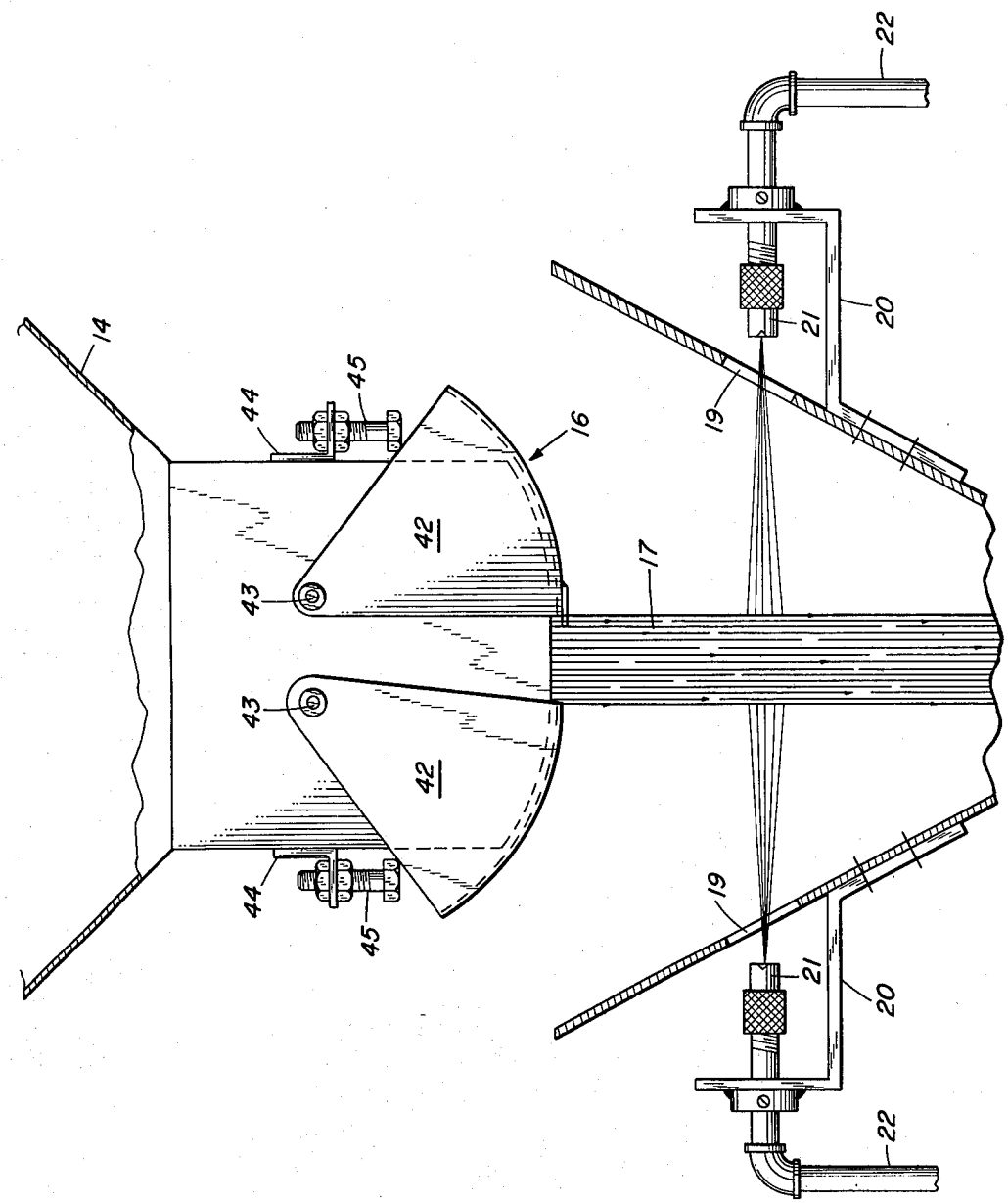
FIG. 2 is an enlarged, partially sectional end elevational view of the gate control mechanism, falling fertilizer curtain and upper portion of the binder solution circuit as shown in FIG. 1.

Now referring to FIG. 1, a hopper 11, preferably a cluster type wherein a variety of materials may be separately stored, is mounted above a weight hopper 13 (mountings not shown) in such manner as to permit deposition of materials from all bins of said cluster hopper in said weigh hopper. Each bin is equipped with an individually operating gate 12, which may be of conventional design but which provides a means for controlling the rate and quantity of material withdrawn from each bin. Weigh hopper 13 is essentially a conventional gravity feed design having inclined depending walls 14 terminating in a hopper chute 15 and is equipped with recording means for determining the weight of the material deposited therein. A flow control gate 16 is mounted at the terminus of said chute 15 and is of such design as to produce a metered flow of material in the form of a substantially uniform falling curtain or stream 17, as shown in FIG. 2, which is essential to the process of the present invention.

A gravity feed hopper 18 is mounted below the weigh hopper 14 in axial alignment with the longitudinal axis of the falling curtain from weigh hopper 13. Openings 19 are provided in opposing side walls of hopper 18 below the bottom center line of the jaws of control gate 16 and opposite the faces of the falling curtain 17. Nozzle mounting brackets 20, affixed to the outer surfaces of the hopper walls, are positioned in such a manner as to locate (1) the central axis of the spray nozzles 21 (see FIG. 2) in alignment with the centers of opening 19 and (2) the nozzle tips a distance from the faces of falling curtain 17 sufficient to provide a fan spray pattern of binder solution of essentially the same width as the falling curtain. Overspray of the binder solution is generally undesirable since it leads to caking of binder and curtain material on the inner walls of hopper 18, while a spray pattern of substantially less width than the falling curtain results in incomplete treatment of curtain materials and may ultimately produce a coated product of less uniformity than could otherwise be obtained. In the preferred embodiment of the invention, nozzles 21, as have been specifically shown in FIG. 2, are positioned to direct the spray of binder solution in a flat fan spray pattern at an angle of approximately 90° to the faces of the falling curtain 17. This angle may be adjusted as much as 45° but best results appear to be obtained when the spray is applied at about right angles to the curtain. We have also determined that it is essential to the process of the invention that the binder solution is sprayed under sufficient force to penetrate at least 10 percent of the thickness of the falling curtain of material measured from the face or faces of the curtain. Best results are obtained with nozzles positioned opposite both faces of the curtain and penetration of the binder solution is approximately 50 percent of the thickness of the curtain from each face.

Binder solution is delivered to spray nozzles 21 under a predetermined pressure and for controlled periods of time through conduits 22 and 24 connected to a storage vessel 23 containing binder solution. Conduit 24 is equipped with a three-way solenoid valve 25, a flowmeter 26 and a positive displacement pump 27 which maintains a fixed pressure in the binder solution circuit. A return line 28 having an adjustable needle valve 29, connects the solenoid valve 25 in conduit 24 with the binder storage vessel 23. A conduit 30 having a back pressure valve 31 and pressure gauge 32 completes a recycle circuit with vessel 23, intersecting supply conduit 24 between flowmeter 26 and pump 27. This circuit provides a means of regulating the pressure on nozzles 21 and acts as a pressure control and relief mechanism if pressure in the supply conduit 14 exceeds predetermined limits.

In operation, materials from the cluster hopper 11 are deposited in the weigh hopper in amounts calculated to give the desired material blend. The three-way solenoid valve 25 in the binder solution circuit is then positioned to circulate binder from vessel 23 through conduits 24, pump 27 and conduit 28 back to vessel 23. The pump is actuated, back pressure valve 31 is adjusted to effect a desired pressure setting and needle valve 29 set to permit the same flow through of binder solution as nozzles 21 deliver at the operating pressure.

A mixer in the form of a tumbling drum 33, preferable of the type equipped with a shrouded conveyor 34 and positioned to receive the binder treated material from hopper 18, is then actuated. Finely divided coating material is charged to a blow case 35 in the coating circuit which is equipped with inlet and outlet valves 36 and 37 respectively and connected to mixer 33 through conduit 38. Said conduit 38 terminates in an open orifice within the mixer 33, preferably in the vicinity of the central axis thereof. While charging the blow case with powdered coating materials, inlet and outlet valves 36 and 37 are closed. Valve 36 is then opened and the blow case pressurized through line 39. When the desired pressure is obtained, valve 36 is closed and the system is in operating condition. Control gate 16 is then opened to permit a curtain of particulate material to begin dropping from the weigh hopper 14. As the curtain forms, solenoid valve 25 is actuated directing the flow of binder solution from the recirculating circuit in the conduit 22 to nozzle 21. When sufficient sprayer material has entered the shrouded conveyor 34 to fill said conveyor and seal the mixer 33 against exhaust of the finely divided coated materials, valve 37 is opened and said coating materials are injected under super atmospheric pressure into mixer 33. Said injection is accomplished with enough force to form a cloud of micronutrients in the chamber. Valve 37 is then closed and the binder treated material is permitted to blend with the coating materials which are present in the form of a cloud in the mixing chamber. As particulate material from the weigh hopper becomes exhausted, solenoid valve 25 is again actuated, spraying of the curtain is halted and binder solution is recycled to the storage vessel 23. Blending in the mixer is continued until coating of the particulate material is uniform. Feed screw 40 of the shrouded conveyor is then reversed and the finished product is withdrawn from mixer 33 through the shrouded conveyor 34 and discharged through line 41, to storage.

FIG. 2 is a side elevation, partially broken away, illustrating a preferred embodiment of the control gate 16 in combination with hopper 18. This Figure further illustrates the preferred arrangement of the spray nozzles 21 and the upper section of the binders solution circuit including conduits 22, and adjustable orifice needle valve 29. In the preferred embodiment of the control gate 16, there is provided a pair of clam shell jaws 42 mounted on pens 43 which are secured to the outer walls of shoot 15. Said jaws may be operated by any controlled actuating means such as pneumatic pistons, gear train or the like herein not shown. Brackets 44 are mounted on shoot walls 15 and are provided with stop pins 45 to limit the rotation of clam shell jaws 42 and control the thickness of the curtain 17 of particulate material withdrawn from the weigh hopper.

FIG. 3 is an exploded view of the pressurized system employed for the introduction of the finely divided coating material to the mixer. Said system comprises a blow case 35 having a conduit 39 connected to a pressurizing means such as a compressor, herein not shown, for providing a positive pressure in said blow case above the powdered material. An inlet valve 36 is provided in conduit 39 to control pressurizing gases introduced into said blow case and a moisture trap 46 located between the blow case 35 and the inlet valve 36 assures removal of moisture in the pressurizing fluid and prevents caking or bridging of the coating materials. Blow case 35 is preferably a gravity feed-type hopper terminating in a truncated cone 47 and an exit conduit 48. Outlet valve 37 is located intermediate conduits 38 and 48 and controls egress of fluidized solids from the blow case. Conduit 38 terminates interiorally of the mixer or tumbling drum 33 below the shrouded conveyor 34. Said mixer is equipped with flights 49 which lift the particulate materials in the mixer blending them in a tumbling cascade. Shrouded conveyor 34 comprising a trough 50 located along the central axis of mixer 33 extends across substantially the full width of said mixer. A reversible screw 40 mounted in trough 50 carries the binder treated particulate material from hopper 18 to the interior of mixer 33 where it is coated and blended. After blending, screw 40 is reversed and the coated materials are withdrawn from mixer. Product is passed to storage by gravity feed through conduit 41.

In accordance with the invention, a variety of granular fertilizer materials such as potash, triple superphosphate, diammonium phosphate, normal superphosphate, limestone, urea, or ammonium nitrate are loaded in separate bins of a cluster hopper. A binder solution, for example, a 30 to 70% aqueous ammonium nitrate, urea, sodium lignin sulfonate or reducing sugar solution or other liquid fertilizers, is charged to the holding vessels in the binder solution circuit and a weighed amount of finely divided micronutrient or secondary nutrient material or a blend of such materials is charged to a powder hopper or blow case in the solids coating circuit which is then pressurized with air or an inert gas such as carbon dioxide or nitrogen. The finely divided material should be at least −100 mesh and more, preferably from −200 to −400 mesh. Particularly well suited for the use in the processes and apparatus of the present invention are the binder solutions, micronutrients and secondary nutrients, described in the U.S. Pat. No. 3,353,949. After charging all circuits with materials, fertilizers from the individual bins are separately deposited in the weigh hopper in calculated amounts.

In addition to having the above specified mesh, the finely divided material should have a bulk density above about 1.2 g./ml. and preferably above about 1.5 g./ml. Where one employs materials having bulk densities below about 1.2 g./ml., problems of rat-holing occur. Rat-holing is the phenomenon wherein the pressurized gas blows a tunnel through the material to be conveyed, rather than causing it to flow. Where blends are employed, the average bulk density of the aggregate should be above about 1.2 g./ml. and preferably above about 1.5 g./ml. Accordingly, in selecting metal oxides, oxidized fume materials of low bulk densities should be avoided. They typically have densities of about 0.5 g./ml. Similarly, baghouse grade, by-product dusts having bulk densities of about 1.0 should be avoided, unless used in combination with heavier materials.

By applying the binder solutions to the fertilizer curtains, as previously described, loss of the finely divided material, equipment fouling and the formation of products having nonuniform coatings of nutrients are avoided. Where the binder solution and stream of finely divided material are both introduced into the mixing chamber, into which the fertilizer granules have been introduced for coating, adherence of the solid nutrients to the chamber walls occurs in favor of adherence to the granules. Using the process of the present invention, such spurious binding is avoided without undue sacrifice in the strength of the desired bond.

The liquid fertilizer solution (i.e., the binder solution) is prepared to circulate through the binder solution circuit, and the micronutrients are readied to be pressurized for the mixer feed operation.

The clam shell jaws are then opened from about 1 − 4 inches and preferably 2 − 3 inches to form a curtain of fertilizer. Immediately after the curtain has formed, the binder solution is permitted to enter the spray nozzles 21. When the trough 50 of the shrouded conveyor 34 is filled with binder treatment fertilizer and the mixer effectively sealed against blowback, a charge of micronutrients, equivalent to about 1 to about 15% and more, preferably from about 1 to about 5% by weight of the fertilizer, is blown at a pressure from about 10 to 250 psig into the interior of the mixer through conduit 38. The cascading materials are permitted to blend until the entire charge of binder treated fertilizer is introduced into the mixture and until a uniform coating thereof is obtained. Just prior to exhaustion of the fertilizer from the weigh hopper, spraying is ceased. When uniform coating is achieved, screw 40 in the shrouded conveyor is reversed and the coated product is withdrawn from the mixture. In operation, about 1 to about 10% of the binder solution and generally about 1 to about 5% by weight is all that is required to obtain uniform coating of the particulate fertilizer.

The following examples are intended to illustrate but are not intended to be limitative of the invention. Unless otherwise specified, the parts given are by weight.

EXAMPLE I

Employing the apparatus illustrated in FIGS. 1 and 2 and the process precisely described in the preferred embodiment, 1,112 pounds of diammonium phosphate, 1,860 pounds of triple superphosphate, 194 pounds of potash, 388 pounds of limestone and 400 pounds of potassium magnesium sulfate are charged to the weigh hopper from the individual bins of the cluster hopper. Forty pounds of a 50% aqueous solution of ammonium nitrate is used as the binder solution and 46 pounds of a micronutrient blend (average mesh size −300, tyler screen, bulk density above about 1.2 g./ml.) of manganese oxide (54.55% Mn) and sodium borate (22% B) is used as the micronutrient coating material.

Five samples from the prepared product are taken and analyzed. The results obtained are recorded under sample numbers 1 A through E below. Two additional 4,000 pound batches are prepared in the identical manner as indicated above and two samples from each are taken, analyzed and reported below as samples 2 A and B and 3 A and B. The uniformity of product obtained by the process and with the apparatus of the invention is clearly evident from these data provided in Table I below.

TABLE I

| Sample No. | Moisture % | Ammonia % | Nitrogen % | Phosphoric Acid | | | Potash % | Total Sulphur % | Manganese % | Boron % | Magnesium % |
|---|---|---|---|---|---|---|---|---|---|---|---|
| | | | | Avail. % | Insol. % | Total % | | | | | |
| 5-15-30 21A | 3.30 | 6.13 | 5.04 | 14.71 | 0.15 | 14.86 | 31.92 | 2.71 | 0.40 | 0.035 | 2.40 |
| 5-15-30 21B | 3.50 | 6.10 | 5.02 | 15.08 | 0.00 | 15.08 | 33.05 | 2.55 | 0.39 | 0.045 | 2.40 |
| 5-15-30 21C | 3.40 | 6.20 | 5.10 | 15.52 | 0.10 | 15.62 | 32.75 | 2.64 | 0.37 | 0.037 | 2.10 |
| 5-15-30 21D | 3.30 | 6.03 | 4.96 | 14.63 | 0.02 | 14.65 | 33.20 | 2.77 | 0.45 | 0.030 | 2.28 |
| 5-15-30 21E | 3.40 | 6.05 | 4.98 | 14.66 | 0.10 | 14.76 | 32.30 | 2.81 | 0.30 | 0.035 | 2.58 |
| 5-15-30 22A | 3.30 | 5.90 | 4.92 | 14.22 | 0.00 | 14.22 | 32.45 | 2.62 | 0.47 | 0.035 | 2.58 |
| 5-15-30 22B | 3.40 | 6.10 | 5.02 | 15.71 | 0.02 | 15.73 | 31.85 | 2.41 | 0.42 | 0.035 | 2.52 |
| 5-15-30 23A | 3.20 | 5.73 | 4.80 | 14.43 | 0.00 | 14.43 | 33.20 | 2.69 | 0.44 | 0.035 | 2.64 |
| 5-15-30 | 3.20 | 5.83 | 4.80 | 14.33 | 0.00 | 14.33 | 32.15 | 2.68 | 0.42 | 0.035 | 2.46 |

TABLE I-continued

| Sample No. | Moisture % | Ammonia % | Nitrogen % | Phosphoric Acid | | | Potash % | Total Sulphur % | Manganese % | Boron % | Magnesium % |
|---|---|---|---|---|---|---|---|---|---|---|---|
| | | | | Avail. % | Insol. % | Total % | | | | | |
| 23B | | | | | | | | | | | |

EXAMPLE II

To compare the process of the invention with techniques previously employed for the manufacture of finished fertilizers, a mixer as shown in FIG. 1 above was charged with 377 pounds of diammonium phosphate, 667 pounds of triple superphosphate, 156 pounds of ammonium nitrate, 800 pounds of potash and 16 pounds of micronutrient, a blend of manganese oxide and zinc oxide, analyzing 31.3% Mn and 31.3% Zn, having an average bulk density above about 1.2 g./ml. 16 pounds of a 50% aqueous ammonium nitrate was then sprayed into the cascading bed of material and blended therewith. After blending the finished product was discharged from the mixer, sampled and analyzed. The results obtained are reported in Table II below where it can be seen that there is a wide variation in samples, especially with regard to zinc content.

TABLE II

| Sample | H$_2$O | N | %P$_2$O$_5$ | K$_2$O | Zn | Mn |
|---|---|---|---|---|---|---|
| A | 3.70 | 5.56 | 22.87 | 24.54 | 0.47 | 0.37 |
| B | 3.70 | 5.64 | 22.98 | 24.62 | 0.22 | 0.35 |
| C | 3.90 | 5.95 | 24.29 | 22.80 | 0.31 | 0.38 |

The above precedure was repeated using the same quantities of fertilizer materials and similar apparatus. However, 60 pounds of zinc oxide and 0.25 pounds of sodium molybdate, calculated to provide 2.25% zinc and 48 ppm. of molybdenum in the finished product were substituted for the micronutrient blend. Twenty pounds of 50% aqueous ammonium nitrate solution was substituted for the 16 pounds of such solution used in the above procedure. The prepared product was sampled and analyzed for zinc and molybdenum. These results are reported below.

TABLE III

| Sample | % Zinc | ppm. Molybdenum |
|---|---|---|
| A | 1.50 | 45 |
| B | 1.59 | 85 |
| C | 1.62 | 55 |
| Calculated | 2.25 | 48 |

EXAMPLE III

Following the procedure of Example II a micronutrient coated (N.P.K. 8-24-12) fertilizer was prepared by charging to a mixer of the type shown in FIG. 1, 484 pounds ammonium nitrate, 1,060 pounds triple superphosphate, 410 pounds of potash and 44 pounds of micronutrients. Said micronutrients having an average bulk density above about 1.2 g./ml. are prepared by admixing 11.9 pounds sodium borate, 17.2 pounds manganese oxide and 14.9 pounds of zinc oxide and calculated to provide a concentration of 0.06% boron, 0.25% manganese and 0.25% zinc in the finished fertilizer. After charging, 20 pounds of a 50% aqueous solution of ammonium nitrate was then sparged into the bed of cascading fertilizers and mixing was continued until the materials appeared to be having uniform consistency.

After blending, the finished product was discharged from the mixer and four 50 pound samples analyzed. Upon completion of discharge it was noted that a substantial amount of caking had occurred on the interior surfaces of the mixer. The analyses of the prepared fertilizer, which is reported below, show that both the manganese and zinc content, obtained by the conventional method of coating herein used, are substantially below the levels of these materials added.

TABLE IV

| | Calculated | Found |
|---|---|---|
| Nitrogen Total | 8 | 7.8 |
| Phosphoric Acid Available | 24 | 24.8 |
| Potash | 12 | 15.1 |
| Boron | 0.06 | 0.073 |
| Manganese | 0.25 | 0.100 |
| Zinc | 0.25 | 0.148 |

I claim:
1. An apparatus for uniformly coating a granular fertilizer with a small amount of a finely divided nutrient material having an average bulk density above about 1.2 g./ml. selected from the group consisting of micronutrients, secondary nutrients and mixtures thereof comprising, in combination:
   a. a hopper for storing granular fertilizer;
   b. a control gate adapted to produce a metered flow of fertilizer from said hopper in the form of a falling curtain;
   c. a storage vessel adapted to contain a binder solution;
   d. nozzles disposed so as to provide spray of said binder solution below said gate, at opposite sides of said curtain so as to produce uniformly sprayed granular fertilizer;
   e. conduits adapted with valve means so as to convey the binder solution at a desired pressure from said storage vessel to said nozzles;
   f. a mixing chamber comprising a tumbling drum adapted to blend said sprayed fertilizer with said nutrient material;
   g. a conveyor adapted so as to receive said sprayed granular fertilizer below said nozzles and to convey the fertilizer received into and from said tumbling drum;
   h. a blow case equipped with a pressurizing means adapted to receive said nutrient material; and
   i. a conduit adapted to inject said nutrient material into said tumbling drum under superatmospheric pressure from said blow case to form a cloud of nutrient material after said chamber is sealed with the sprayed granular fertilizer.

* * * * *